United States Patent [19]

Sakurai et al.

[11] Patent Number: 5,481,605
[45] Date of Patent: Jan. 2, 1996

[54] PRIVATE BRANCH EXCHANGE CAPABLE OF ANALYZING INFORMATION RECEIVED FROM ISDN

[75] Inventors: Shigeki Sakurai, Yokohama; Shoichi Takashima, Tokyo, both of Japan

[73] Assignee: Canon Kabushiki Kaisha, Tokyo, Japan

[21] Appl. No.: 85,147

[22] Filed: Jul. 2, 1993

Related U.S. Application Data

[63] Continuation of Ser. No. 797,968, Nov. 26, 1991, abandoned.

[30] Foreign Application Priority Data

Nov. 27, 1990 [JP] Japan .................................. 2-326229
Nov. 27, 1990 [JP] Japan .................................. 2-326230
Nov. 27, 1990 [JP] Japan .................................. 2-326231

[51] Int. Cl.$^6$ .......................... H04M 3/00; H04M 11/00; H04M 7/00; H04J 3/12
[52] U.S. Cl. .......................... 379/243; 358/442; 358/468; 370/60.1; 370/110.1; 379/93; 379/100; 379/233; 379/234
[58] Field of Search .................... 358/433, 434, 358/442, 468; 370/110.1, 60, 60.1; 379/93, 94, 95, 100, 211, 212, 233, 244, 234, 242, 243

[56] References Cited

U.S. PATENT DOCUMENTS

| | | | |
|---|---|---|---|
| 4,961,185 | 10/1990 | Sawada ............................. | 379/100 X |
| 5,023,868 | 6/1991 | Davidson et al. .................. | 379/94 X |
| 5,042,028 | 8/1991 | Ogawa ............................. | 379/94 X |
| 5,050,005 | 9/1991 | Kagami ............................ | 358/434 |
| 5,062,133 | 10/1991 | Melrose ........................... | 379/94 |
| 5,067,128 | 11/1991 | Tsuchida .......................... | 370/60 |
| 5,142,568 | 8/1992 | Ogata et al. ...................... | 379/100 |
| 5,233,648 | 8/1993 | Nakamura ......................... | 379/210 X |

FOREIGN PATENT DOCUMENTS

| | | | |
|---|---|---|---|
| 0341687 | 11/1989 | European Pat. Off. . | |
| 3621869 | 1/1988 | Germany . | |
| 3808413 | 5/1989 | Germany . | |
| 0085466 | 3/1989 | Japan ............................ | 379/211 |
| 0202962 | 8/1989 | Japan ............................ | 379/94 |
| 2-200055 | 8/1990 | Japan . | |

*Primary Examiner*—Jeffery A. Hofsass
*Assistant Examiner*—Harry S. Hong
*Attorney, Agent, or Firm*—Fitzpatrick, Cella, Harper & Scinto

[57] ABSTRACT

A method of deciding whether an extension terminal is called or not is provided. The kind of communication is recognized on the basis of a set-up message received from the ISDN. Whether the extension terminal is called or not is decided on the basis of the result of comparison between the kind of the extension terminal and the kind of the communication recognized. There is also provided a private branch exchange comprising: a detector to detect a reception from an analog external line; a digital interface to connect a terminal corresponding to a procedure for a digital line; and a judging circuit to judge whether the terminal corresponds to a procedure for an analog line or not, wherein when the judging circuit decides that the terminal corresponds to the procedure for the analog line when the reception is detected by the detector, the digital interface transmits the set-up message to the terminal.

37 Claims, 11 Drawing Sheets

| FIG. 5A | FIG. 5B |

PRIVATE BRANCH EXCHANGE CAPABLE OF ANALYZING INFORMATION RECEIVED FROM ISDN

This application is a continuation of application Ser. No. 07/797,968 filed Nov. 26, 1991 now abandoned.

BACKGROUND OF THE INVENTION

1. Field of the Invention

The invention relates to a private branch exchange which can cope with services of the ISDN.

2. Related Background Art

According to a conventional private branch exchange, when a call is received from an ISDN line, all of digital terminals which have been preset in correspondence to the line are allowed to ring. When a call is received from an analog line, all of analog terminals which have been preset in correspondence to the line are allowed to ring.

In the conventional private branch exchange, therefore, even when a transmission terminal notifies information indicating that it wants to execute a communication as a telephone through the ISDN, not only the digital telephones but also the G4 facsimiles are allowed to ring. Consequently, when the G4 facsimile responds to a call reception, the communication cannot be performed.

On the other hand, in the conventional private branch exchange, even when a transmission terminal notifies information indicating that it wants to perform a data communication through the ISDN, not only the G4 facsimiles but also the digital telephones which can perform only the communication are allowed to ring. Therefore, when such a digital telephone responds to a call reception, the data communication cannot be performed.

In the conventional private exchange, when a G3/G4 facsimile having both of the G3 and G4 functions is connected to an extension digital interface, in the case where a call is received from the G3 facsimile through the analog line, the G3/G4 facsimile cannot be allowed to respond to the call reception.

SUMMARY OF THE INVENTION

It is an object of the invention to improve a private branch exchange which can cope with services of the ISDN.

Another object of the invention is to provide a private branch exchange which calls an extension terminal having the function to execute a communication of the designated kind in the services of the ISDN.

Still another object of the invention is to provide a private branch exchange which analyzes reception information received from the ISDN and doesn't call a data communication terminal in the case where an information transmission ability of a transmission ability information element relates to a voice.

Further another object of the invention is to provide a private branch exchange which analyzes reception information received from the ISDN and doesn't call a terminal which doesn't have the G3 communicating function in the case where an information transmission ability of a transmission ability information element relates to an audio of 3.1 kHz and high-order layer characteristic identification data of a high-order layer consistency information element relates to G3.

Further another object of the invention is to provide a private branch exchange which analyzes reception information received from the ISDN and doesn't call an extension terminal which doesn't have the data communicating function in the case where an information transmission ability of a transmission ability information element relates to a non-limited digital.

Further another object of the invention is to provide a private branch exchange which calls an extension terminal corresponding to both of a procedure for an analog line and a procedure for a digital line in the case where a call is received from the analog line.

The above and other objects and features of the present invention will become apparent from the following detailed description and the appended claims with reference to the accompanying drawings.

DETAILED DESCRIPTION OF THE PREFERRED EMBODIMENT

Figure 1:
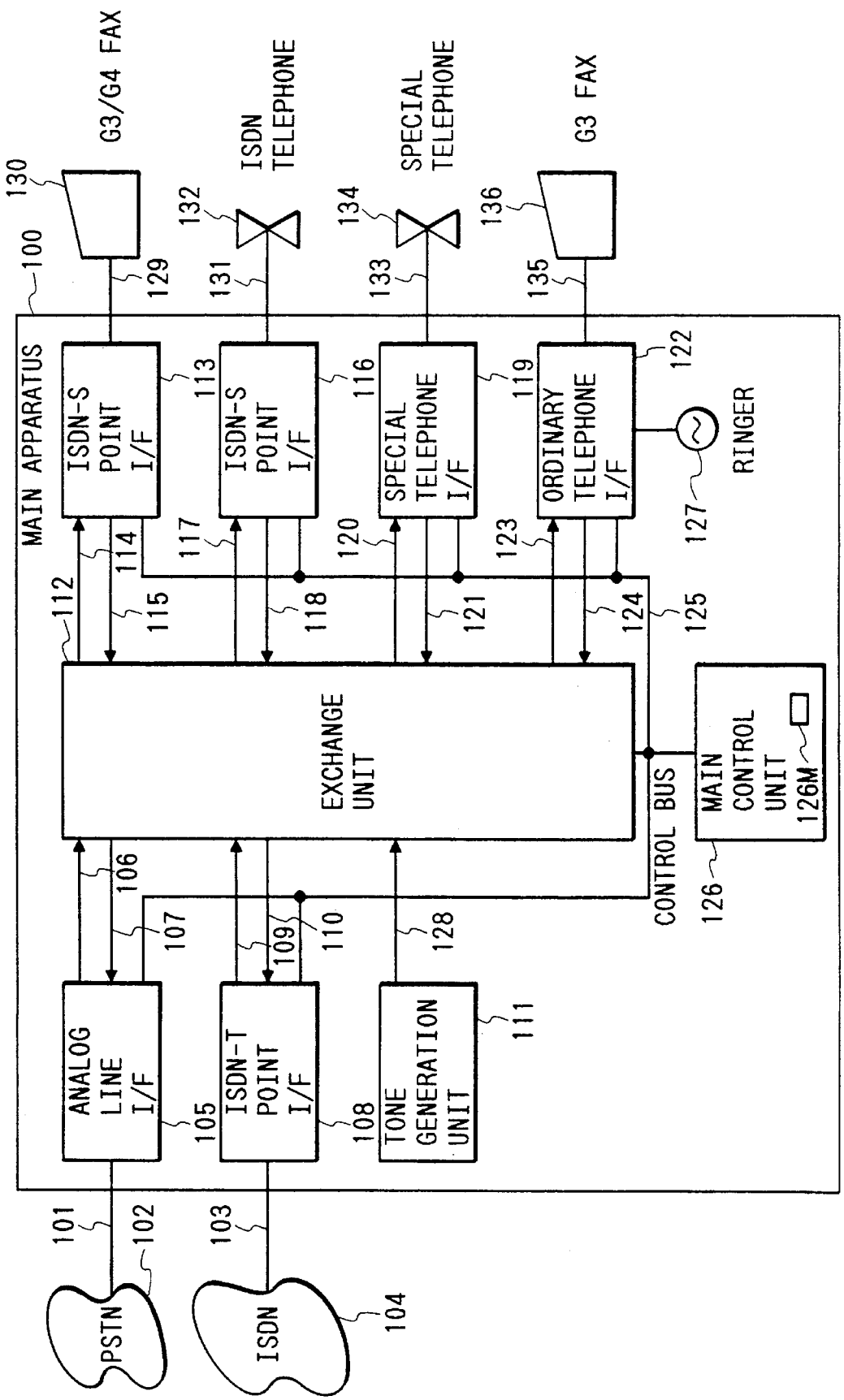
FIG. 1 is a block diagram of an apparatus embodying the invention.

FIG. 1 is a block diagram showing a system construction of the invention. In the diagram, reference numeral 100 denotes a main apparatus of a telephone exchange; 102 an analog telephone network; 104 an ISDN (integrated service digital network) as a digital public network; and 105 an analog line interface which is connected to the analog telephone network 102 through a line 101. An exchange method in the embodiment uses a time-sharing method. Therefore, the analog line I/F 105 is connected to an exchange unit 112 through an up PCM highway 106 and a down PCM highway 107. Reference numeral 108 denotes an ISDN-T point interface which is connected to the ISDN 104 through a line 103.

The ISDN-T point interface 108 is connected to the exchange unit 112 through an up PCM highway 109 and a down PCM highway 110.

Reference numeral 113 denotes an ISDN-S point interface which has the function to enclose ISDN terminals for extensions and encloses a G3/G4 facsimile 130 through a line 129. The ISDN-S point interface 113 is connected to the exchange unit 112 through a down PCM highway 114 and an up PCM highway 115. Reference numeral 116 denotes a similar ISDN-S point interface to enclose an ISDN telephone 132 through a line 131 in the embodiment. The ISDN-S point inter-face 116 is also connected to the exchange unit 112 through PCM highways 117 and 118.

Reference numeral 119 denotes a special telephone interface to enclose a special extension telephone 134 only for use in the system through a line 133 for an extension. The special telephone interface 119 is connected to the exchange unit 112 through PCM highways 120 and 121. The special extension telephone 134 also includes a telephone having the function to connect an SLT (single line telephone: telephone for an analog public network).

Reference numeral 122 denotes an ordinary telephone interface to enclose a G3 facsimile 136 through a line 135. The ordinary telephone interface 122 is connected to the exchange unit 122 through PCM highways 123 and 124. A ringer generation unit 127 generates a call signal of 16 Hz and 75 $V_{rms}$. A tone generation unit 111 is connected to the exchange unit 112 through a PCM highway 128 and generates various kinds of service tones to extension terminals.

Reference numeral 126 denotes a main control unit to control the whole system. The main control unit 126 is connected to each of the above interfaces and the exchange unit 112 through a control bus 125. Reference numeral 126M denotes a memory in which information which is necessary for the main control unit 126 to control the whole system is stored. The information stored in the memory 126M includes information indicating which extension terminal is connected to which extension position and the like.

Each of the interfaces 113, 116, 119, and 122 can connect a plurality of extension terminals having the same function.

Figure 2:
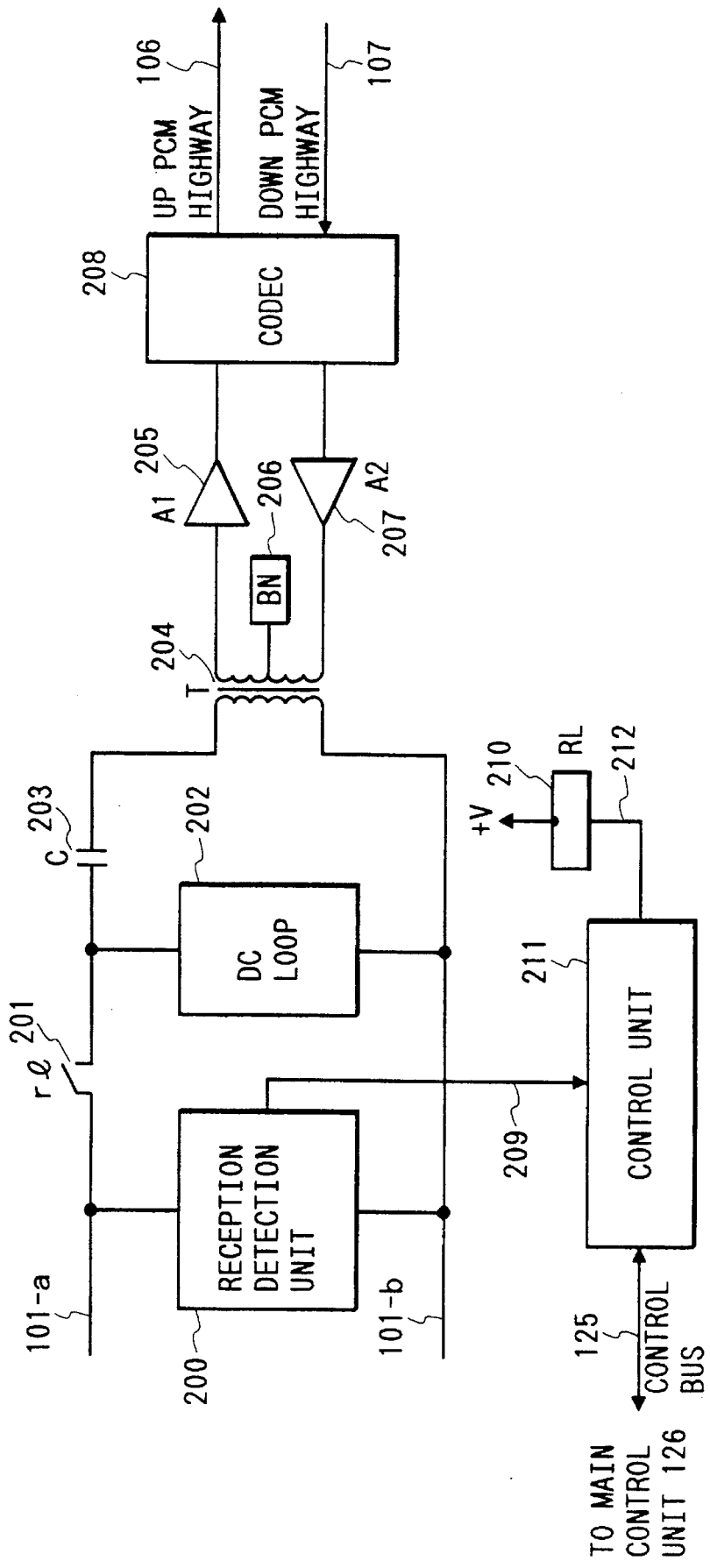
FIG. 2 is a block diagram of an analog line interface of the apparatus embodying the invention.

FIG. 2 is a block diagram of the analog line interface 105 of the embodiment. In the diagram, reference numerals 101a and 101b denote lines from the analog telephone network 102. Reference numeral 200 denotes a reception detection unit to detect a call reception from the analog telephone network. A detection signal is sent to a control unit 211 through a signal line 209. Reference numeral 201 denotes a relay to form a DC loop by a reception response. The relay 201 is driven by the control unit 211 through a signal line 212. Reference numeral 202 denotes a DC loop circuit for the response mentioned above and 203 indicates a capacitor to cut a DC current.

Reference numeral 204 denotes a hybrid transformer to execute a two-wire/four-wire conversion of an AC signal; 205 a receiving amplifier for converting the level of the AC signal from the hybrid transformer 204 and supplying to a codec 208; 207 a transmitting amplifier for converting the level of an AC signal from the codec 208 and supplying to the hybrid transformer 204; and 206 a balancing network serving as a matching circuit to eliminate a leakage of the AC signal from the transmitting amplifier to the receiving amplifier. The codec 208 is a circuit to convert the analog signal into the PCM (pulse code modulation) signal and to convert the PCM signal into the analog signal, respectively. The codec 208 is connected to the exchange unit 112 through the down PCM highway 107 and the up PCM highway 106.

Figure 3:
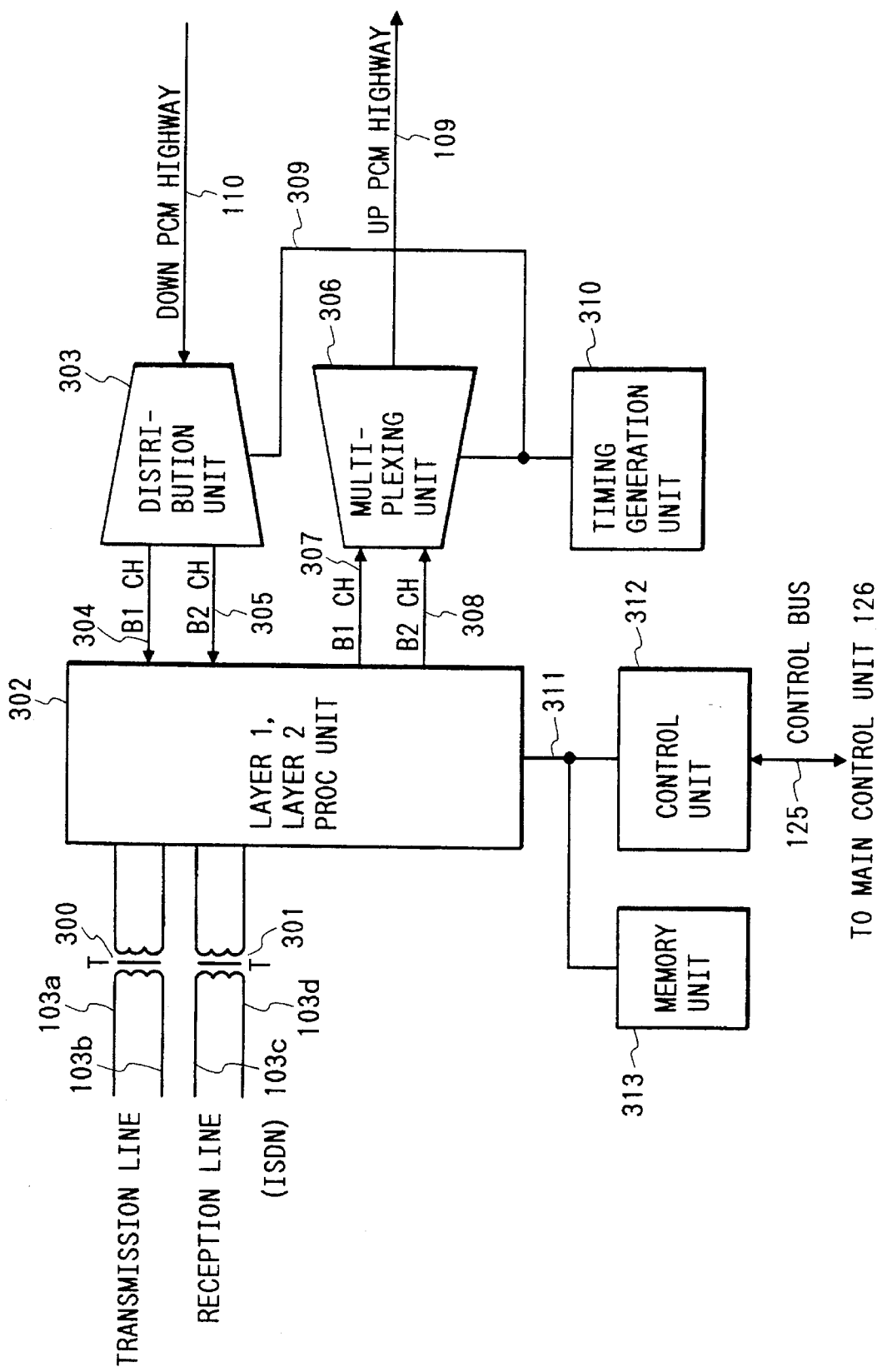
FIG. 3 is a block diagram of an ISDN-T point interface of the apparatus embodying the invention.

FIG. 3 is a block diagram of the ISDN-T point interface in the embodiment. In the diagram, reference numerals 103a, 103b, 103c, and 103d denote lines-from the ISDN 104, Reference numeral 302 denotes a processing unit of layers 1 and 2, The processing unit 302 is connected to the lines through transformers 300 and 301, Reference numeral 303 denotes a distribution unit to separate and distribute $B_1$ and $B_2$ channels from the down PCM highway 110. The separated and distributed $B_1$ channel signal is connected to the layer 1–2 processing unit 302 through a signal line 304. The $B_2$ channel signal is connected to the layer 1–2 processing unit 302 through a signal line 305, Reference numeral 306 denotes a multiplexing unit to multiplex the separated $B_1$ and $B_2$ channels. The $B_1$ channel signal from the layer 1–2 processing unit 302 is supplied to the multiplexing unit 306 through a signal line 307. The $B_2$ channel signal from the processing unit 302 is supplied to the multiplexing unit 306 through a signal line 308, The $B_1$ and $B_2$ channel signals are multiplexed by the multiplexing unit 306 and a multiplexed signal is sent to the up PCM highway 109. A timing generation unit 310 supplied a timing signal to the distribution unit 303 and the multiplexing unit 306 through a signal line 309, A control unit 312 controls the ISDN-T point interface and is connected to the layer 1–2 processing unit 302 and a memory unit 313 through a control line 311 and is also connected to the main control unit 126 through the control bus 125.

The layer 1–2 processing unit 302 sets a call from, the ISDN 104 and transfers to the main control unit 126.

Figure 4:
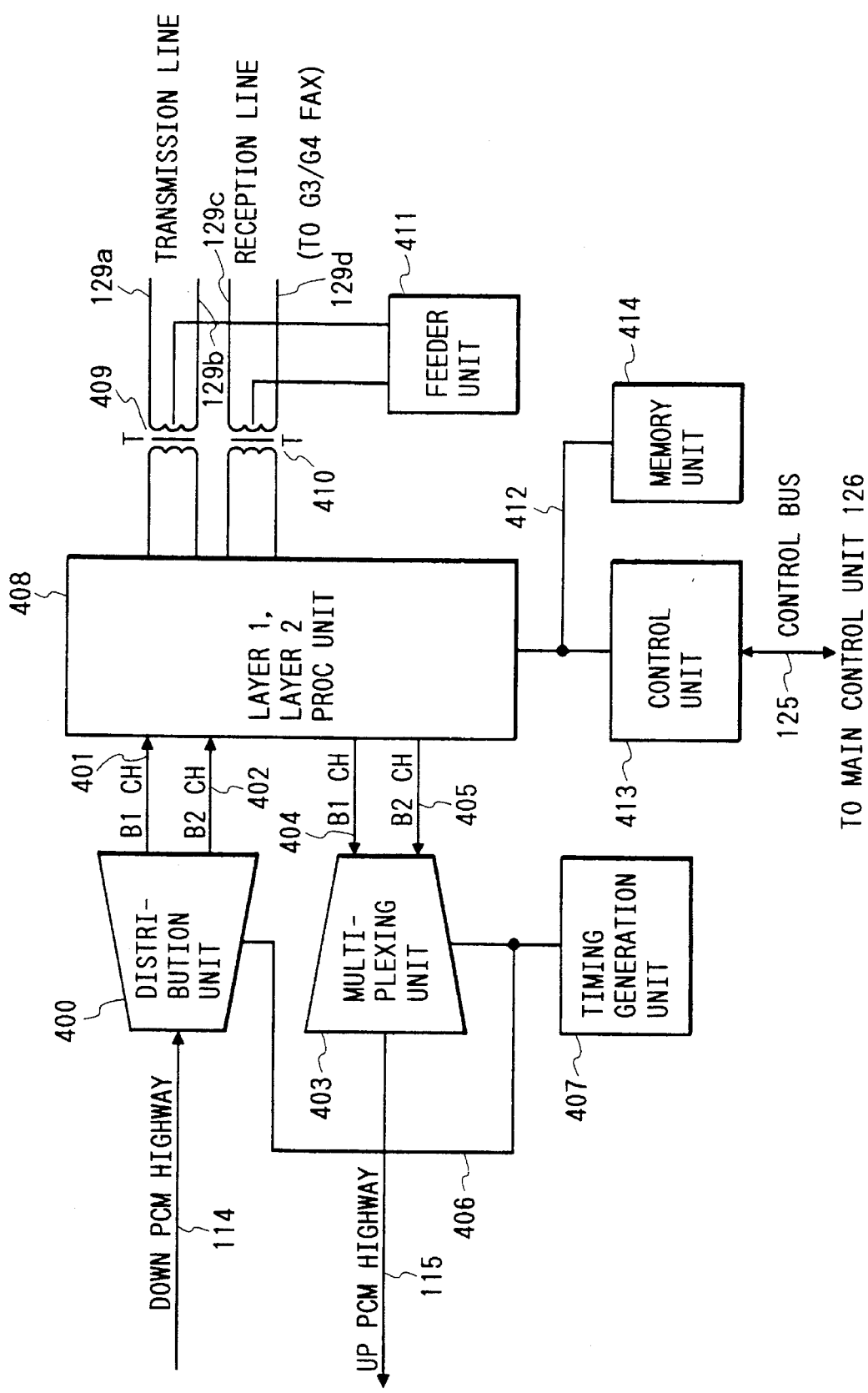
FIG. 4 is a block diagram of an ISDN-S point interface of the apparatus embodying the invention.

FIG. 4 is a block diagram of the ISDN-S point interface of the embodiment. In the diagram, reference numerals 129a, 129b, 129c, and 129d denote lines which are connected to the G3/G4 facsimile 130. Reference numeral 408 denotes a processing unit of the layers 1 and 2. The processing unit 408 is connected to the lines through transformers 409 and 410.

Reference numeral 400 denotes a distribution unit to separate and distribute the $B_1$ and $B_2$ channels from the down PCM highway 114. The separated and distributed $B_1$ channel signal is supplied to the layer 1–2 processing unit 408 through a signal line 401. The $B_2$ channel signal is supplied to the processing unit 408 through a signal line 402. Reference numeral 403 denotes a multiplexing unit to multiplex the separated $B_1$ and $B_2$ channel signals. The $B_1$ channel signal from the processing unit 408 is supplied to the multiplexing-unit 403 through a signal line 404, while the $B_2$ channel signal is supplied to the multiplexing unit 403 through a signal line 405. The $B_1$ and $B_2$ channel signals are multiplexed by the multiplexing unit 403 and a multiplexed signal is sent to the up PCM highway 115. Reference numeral 407 denotes a timing generation unit to supply a timing signal to the distribution unit 400 and the multiplexing unit 403 through a signal line 406.

A control unit 413 controls the ISDN-S point interface and is connected to the layer 1–2 processing unit 408 and a memory unit 414 through a control line 412. The control unit 413 is also connected to the main control unit through the control bus 125.

Reference numeral 411 denotes a power supplying circuit unit (feeder unit) to supply a power source to the G3/G4 facsimile 130.

The operation of the main control unit 126 will now be described in accordance with a flowchart shown in FIG. 5.

When the main control unit 126 detects the call reception in step S500, the kind of line is discriminated in step S501. When the kind of line indicates the call reception from the PSTN 102, step S502 follows. When it indicates the call reception from the ISDN 104, step S513 follows.

The call reception from the PSTN 102 is detected by the reception detection unit 200 in FIG. 2 and a detection signal is sent to the control unit 211 through the signal line 209. The detection signal is subsequently transmitted to the main control unit 126 through the control bus 125, so that the call reception from the PSTN 102 is detected by the main control unit 126.

On the other hand, a detection signal of the call reception from the ISDN 104 is transmitted through the reception lines 103c and 103d in FIG. 3 and is sent from the layer 1–2 processing unit 302 to the control unit 312 through the signal line 311. The D channel information indicative of such a reception is transmitted to the main control unit 126 through the control bus 125, so that the call reception from the ISDN 104 is detected by the main control unit 126.

When a call from the PSTN 102 is received, a check is first made in step S502 to see if a calling process to the ring assignment extension has been finished or not. When the calling process is not finished yet, the main control unit 126 searches the ring assignment extension in step S503. The process is branched in step S504 in accordance with the kind of extension.

In the case where information indicating that the kind of ring assignment extension indicates the S point telephone has already been registered in the memory 126M, the main control unit 126 discriminates whether such as extension is a G4 facsimile or not by referring to the memory 126M in step S505. If YES, step S506 follows. If NO, step S507 follows to execute a ringing process.

In step S506, the main control unit 126 discriminates whether such a G4 facsimile has the G3 function or not by referring to the memory 126M. If YES, step S507 follows. If NO, the ringing process is not performed and the processing routine is returned to step S502 to search the next ring assignment extension.

The main control unit 126 requests a call setting through the ISDN-S point interfaces 113 and 116 to the terminals 130 and 132 connected to the S point in step S507 and waits for a call set acceptance display from the terminals 130 and 132. When it is determined in step S508 that the call set acceptance display has been transmitted, a check is made in step S509 to see if there are call notifications from the terminals 130 and 132 or not. When the call notification is recognized in step S509, the processing routine is returned to step S502.

In the case where the kind of ring assignment extension has been registered as a special telephone in the memory 126M in step S504, the main control unit 126 progresses the processing routine to step S510. In step S510, a ringing tone is selected from the tone generation unit 111 shown in FIG. 1 and is connected to the ring assignment special telephone through the exchange unit 112. In step S511, a speaker of the special telephone is turned on. In step S512, a state indicative of the in-reception is displayed. For instance, when the special telephone has a display such as an LCD (liquid crystal display) or the like, the in-reception is displayed by the LCD. When the special telephone has an LED (light emitting diode) or the like in correspondence to an external line button or the like, the LED is allowed to flicker or the like.

In step S504, when the ring assignment extension is an SLT (two-wire telephone) or a G3 facsimile, the ringer generation unit 127 in FIG. 1 is turned on in step S513 and an IR (call) signal is sent to the terminal. The processing routine is returned to step S502.

In step S502, a check is made to see if all of the extensions to be allowed to ring have been searched or not. If YES, the processing routine advances to an "in-calling" state and the apparatus waits for a response from the extension. If NO, the processes are repeated from step S503.

In the case of ringing one extension such as in the case of a DIL (direct inline) or the like, the processes are also similarly executed.

When the main control unit 126 detects that the extension such as a G3/G4 facsimile 130 has responded through the ISDN-S point interface 113, the main control unit controls the exchange unit 112 so as to connect the external line 101 which has received and the extension 130 which has responded.

On the contrary, in the case where there is a request for the G3 transmission from the G3/G4 facsimile 130 through the PSTN 102, the main control unit 126 recognizes the generation of such a request through the ISDN-S point interface 113 and controls the analog line interface 105 in accordance with dial information from the G3/G4 facsimile 130, thereby performing a call generation. The main control unit 126 controls the exchange unit 112 so as to connect the G3/G4 facsimile 130 with the external line which has generated the call in the PSTN 102.

On the other hand, when the main control unit 126 detects the call reception by the ISDN-T point interface 108, in step S515, the received call set (set-up) information is stored into the memory 126M and a transmission ability information element in the call set information is extracted. In step S516, the process is branched by referring to the information transfer ability included in such information.

Figure 9:
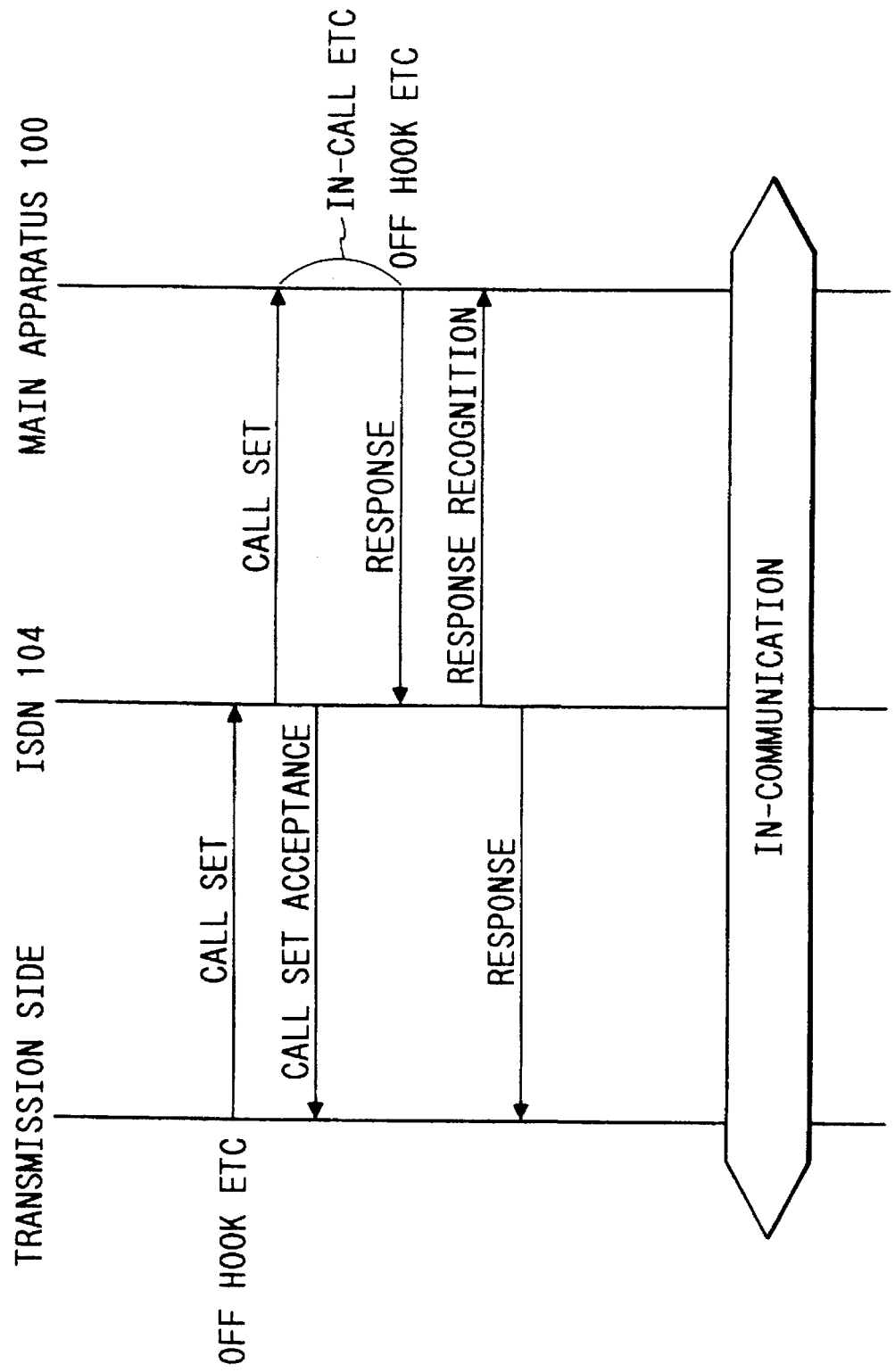
FIG. 9 is a communication schematic sequence of the ISDN.

FIG. 9 shows a schematic sequence of the call reception from the ISDN 104.

When the transmission user executes the off-hook or the like and sends a call set message to the ISDN 104, the ISDN 104 transmits the call set message to the main apparatus 100. The ISDN 104 also sends a call set acceptance message to the transmission user in order to transmit the information indicating that the call set from the transmission user has been received.

The main control unit 126 of the main apparatus 100 receives the call set and recognizes the reception call and executes a calling process and the like in step S516 and subsequent steps. The main control unit 126 detects the operation such as an off-hook or the like and transmits a response message to the ISDN 104. The ISDN 104 transmits a response recognition message to the main apparatus 100 and transmits a response message to the transmission user.

Figure 10:
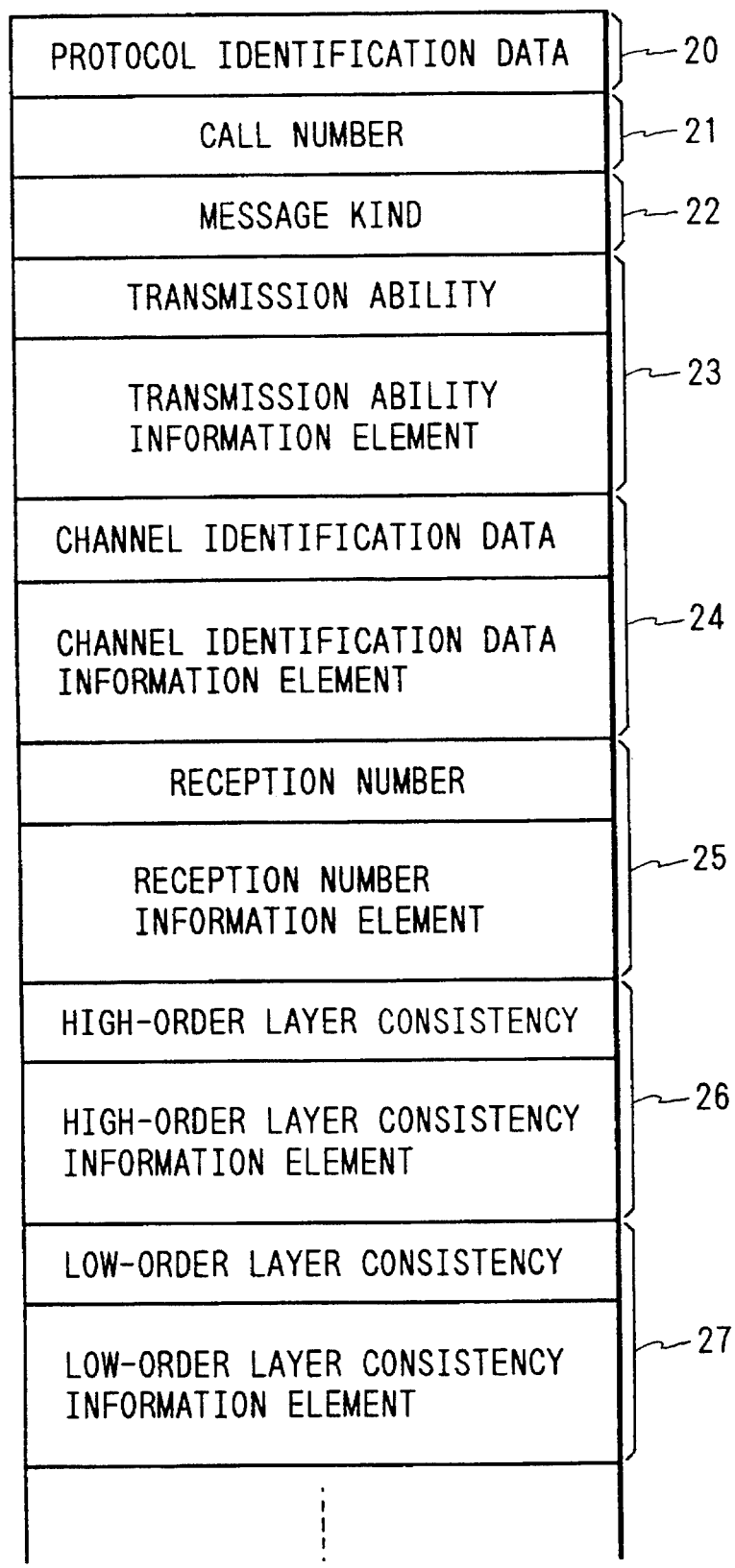
FIG. 10 shows an information format of messages of the ISDN.

For the reception of the ISDN 104, that is, the call set message, as shown in FIG. 10, the kinds of communication are shown in the transmisison ability information elements. The kinds of communication services are further finely specified in the optional high-order layer consistency information elements.

FIG. 10 shows information formats when messages of a call generation, a reception call, a response, etc. in the ISDN are transmitted. The case of the call set message is shown as an example in FIG. 10.

Reference numeral 20 denotes protocol identification data; 21 a call number; 22 a kind of message in which the value indicative of the call set is set; and 23 to 27 blocks in which necessary information can be added every message kind. The kind of information element is set into a head octet in each block.

The transmission ability in the block 23 specifies the information transfer ability or the like of a voice, 3.1 kHz audio, and non-limited digital The channel identification data in the block 24 specifies the interface type (fundamental or primary group) or specifies whether a change in channel of the fundamental interface is permitted or not.

The reception number in the block 25 designates a communication partner and the telephone number of the reception user is set. The network is transparently transmitted to the high-order layer consistency in the block 26. The high-order layer consistency specifies the kind of communication service such as telephone, G2/G3, G4, teletex, or the like. The low-order layer consistency in the block 27 specifies an information transfer speed, each format (e.g., stop bit, parity) upon data communication, and the like.

Figure 6:
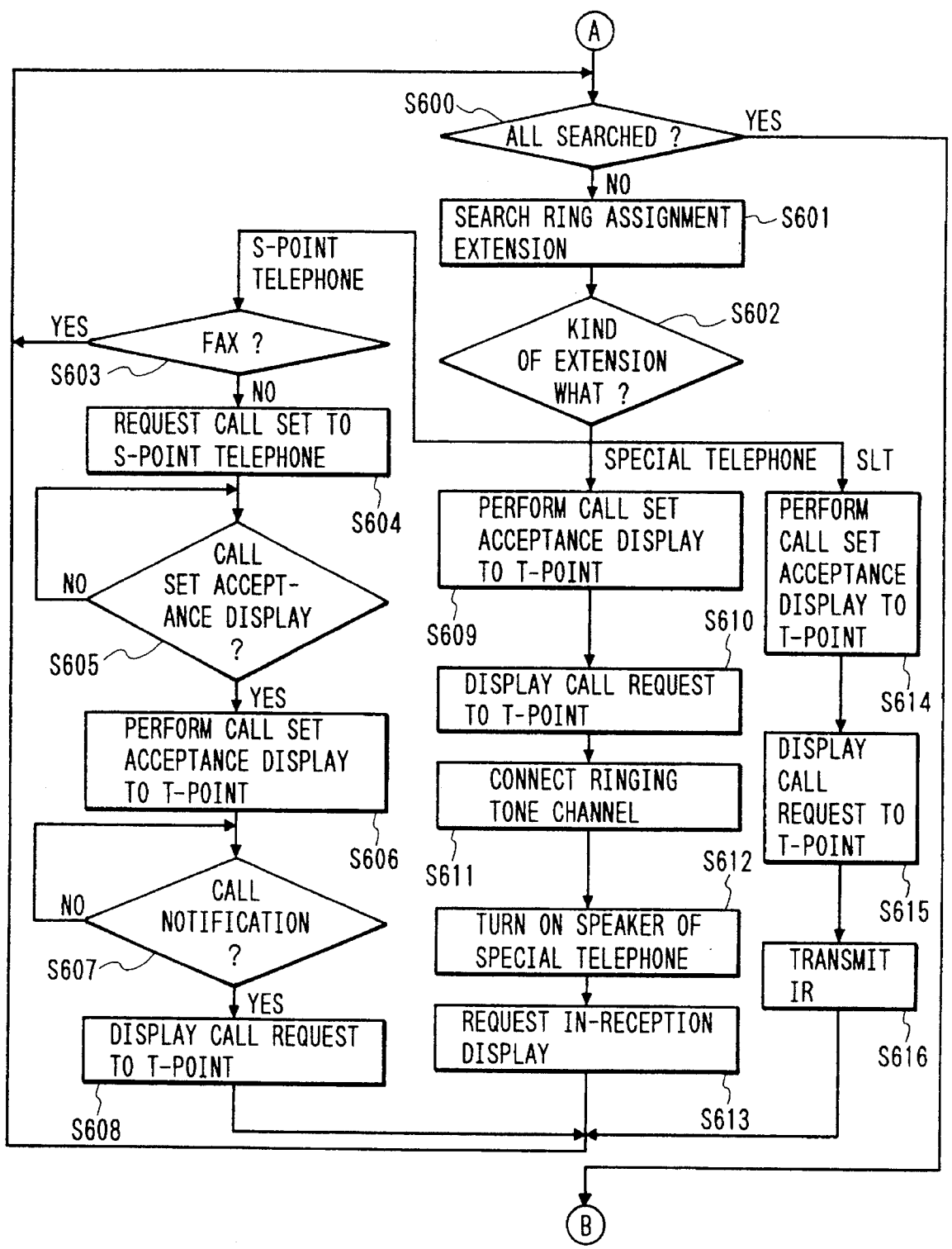

The case where the information transfer ability relates to the speech will now be described with reference to a flowchart of FIG. 6.

In step S600, the main control unit 126 first checks to see if a calling process to the ring assignment extensions has been finished or not. If NO, the ring assignment extensions registered in the memory 126M are searched in step S601. The kinds of ring assignment extensions registered in the memory 126M are discriminated in step S602 and the processing routine is branched.

When the main control unit 126 determines that the extension is an S-point telephone by referring to the memory 126M, a check is further made in step S603 to see if the extension is a G4 facsimile or not by referring to the memory 126M. When it is the G4 facsimile, the processing routine is returned to step S600 without executing the calling process. When it is not the G4 facsimile, the main control unit 126 sends a call set request to the S-point telephone in step S604 and waits for the call set acceptance display from the S-point telephone. When the main control unit 126 recognizes the call set acceptance display from the terminal in step S605, the call set acceptance display is sent to a T point, namely, the external line 103 which has received the call by the ISDN-T point interface 108 in step S606. When the call notification from the S-point telephone is subsequently recognized in step S607, a call request display is sent to the external line 103 in step S608. The processes in steps S606 and S608 are omitted so long as they have already been executed at least once by another route.

When the ring assignment extension is the special telephone 134 in step S602, the call set acceptance display is sent to the T point, namely, the external line 103 in step S609. The call request dispaly is transmitted in step S610. The processes in steps S609 and S610 are omitted so long as they have already been executed at least once by another route.

A ringing tone is selected from the tone generation unit 111 shown in FIG. 1 in step S611. The ringing tone is connected to the ring assignment special telephone through the exchange unit 112. The speaker of the special telephone 134 is turned on in step S612. The in-reception display is executed in step S613 in a manner similar to step S512.

When the ring assignment extension is an SLT or G3 facsimile in step S602, the call set acceptance display and the call request display are executed to the T point, namely, the external line 103 in steps S614 and S615. The processes in steps S614 and S615 are omitted so long as they have already been executed at least once by another route. In step S616, the ringer generation unit 127 in FIG. 1 is turned on and the IR signal is sent to the terminal. The calling process is finished.

Figures 5, 5A:
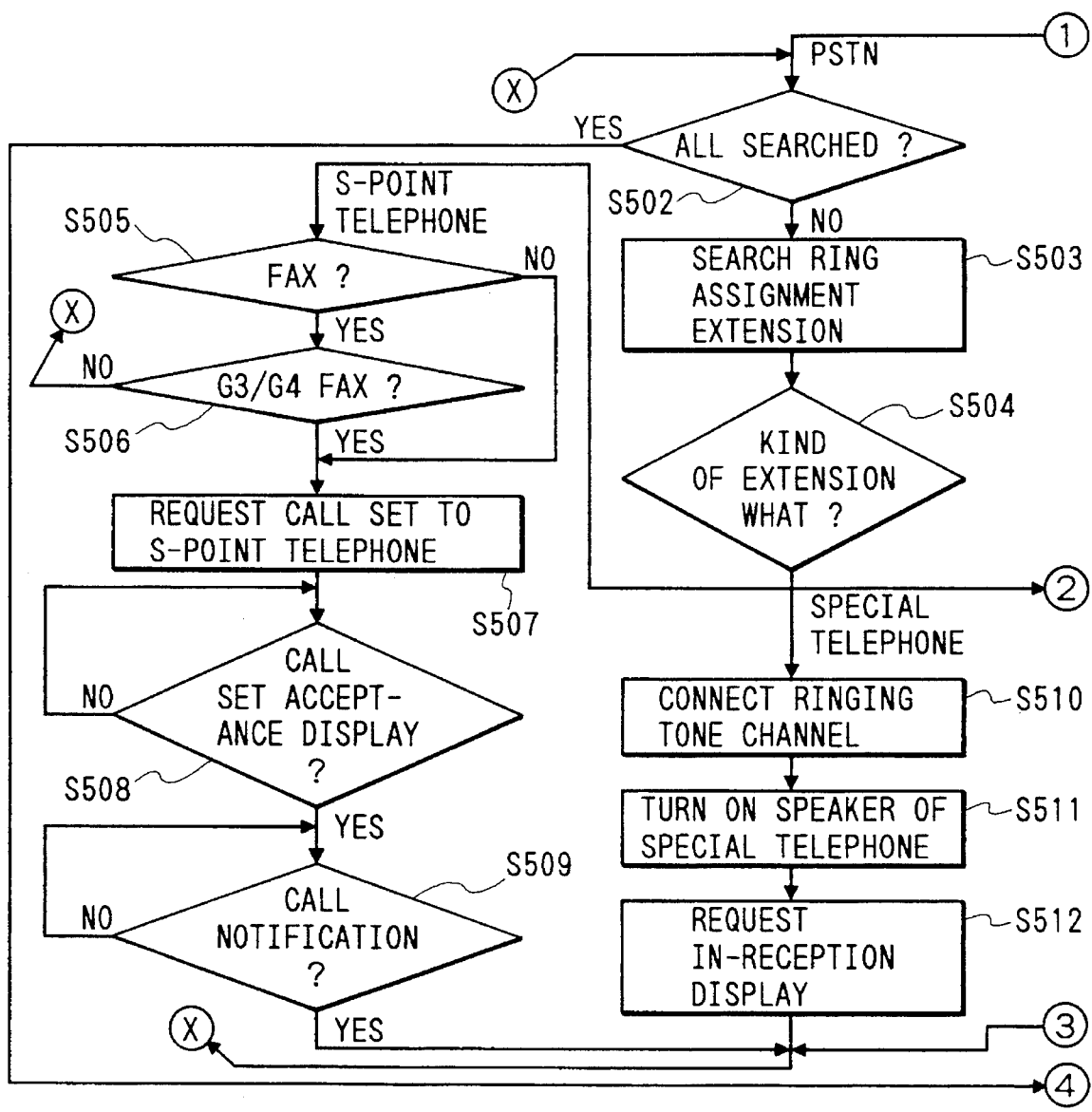
FIGS. 5 to 8 are flowcharts for embodying the invention.
Figure 7:
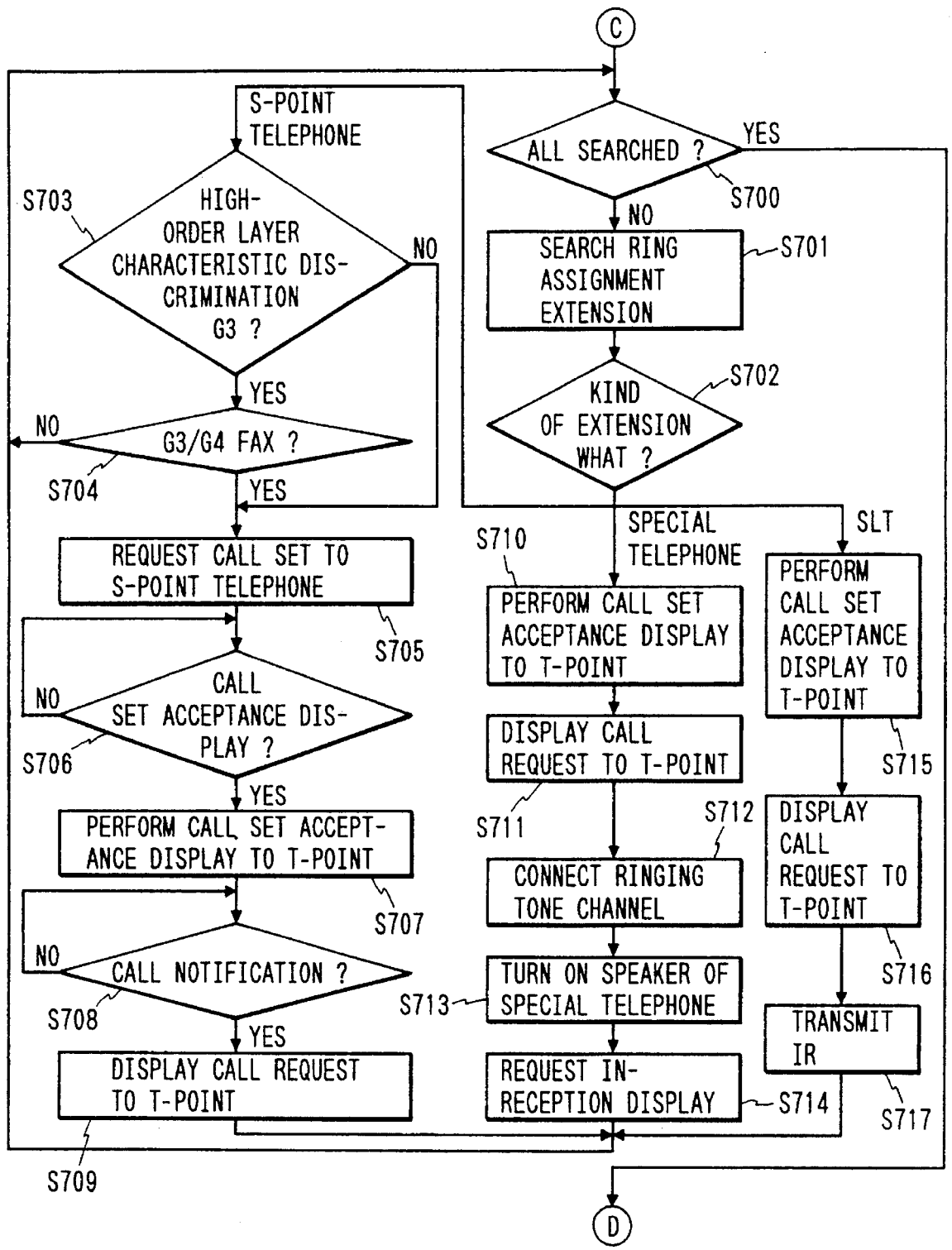

On the other hand, when the information transfer ability indicates 3.1 kHz audio in step S516 in FIG. 5, the main control unit 126 executes the processes shown in FIG. 7.

The main control unit 126 discriminates whether the calling process has been finished or not in step S700. If NO, the ring assignment extension registered in the memory 126M is extracted in step S701.

The main control unit 126 discriminates the kind of ring assignment extension by referring to the memory 126M in step S702. When the ring assignment extension extracted in step S701 indicates the S-point telephone, a check is made in step S703 to see if the high-order layer characteristic identification data indicates the G3 facsimile or not by referring to the high-order layer consistency information element which has been received from the external line 104 and stored in the memory 126M. When it is the G3 facsimile, step S704 follows. When it is not the G3 facsimile or when such information element is not transmitted, step S705 follows.

In step S704, the main control unit 126 discriminates whether the S-point telephone terminal extracted in step S702 is the G3/G4 facsimile having the G3 function or not by referring to the memory 126M. When it is the G3/G4 facsimile, step S705 follows. If NO, the processing routine is returned to step S700.

When the terminal is the G3/G4 facsimile which doesn't have the G3 function or the ISDN telephone having only the telephone function, the reception to the terminal registered in the memory 126M is inhibited. Therefore, it is possible to prevent that the call is received to the terminal which has been designated from the ISDN 104 and cannot perform the communication and a communicating efficiency deteriorates.

In step S705, the call set request is sent to the S-point telephone and a check is made to see if the call set acceptance display is generated from the S-point telephone or not. When the main control unit 126 recognizes the call set acceptance display from the terminal in step S706, the call set acceptance display is sent to the T point, namely, the external line 103 to which a reception call is performed by the ISDN-T point interface 108 in step S707. Subsequently, when the call notification from the S-point telephone is recognized in step S708, the call request display is sent to the external line 103 in step S709. The processes in steps S707 and S709 are omitted so long as they have already been executed at least once by another route.

When the ring assignment extension is the special telephone 134 in step S702, step S710 follows. The processes in steps S710 to S714 are similar to those in steps S609 to S613.

When the ring assignment extension is the SLT or G3 facsimile in step S702, step S715 follows. The processes in steps S715 to S717 are similar to those in steps S614 to S616.

Figure 8:
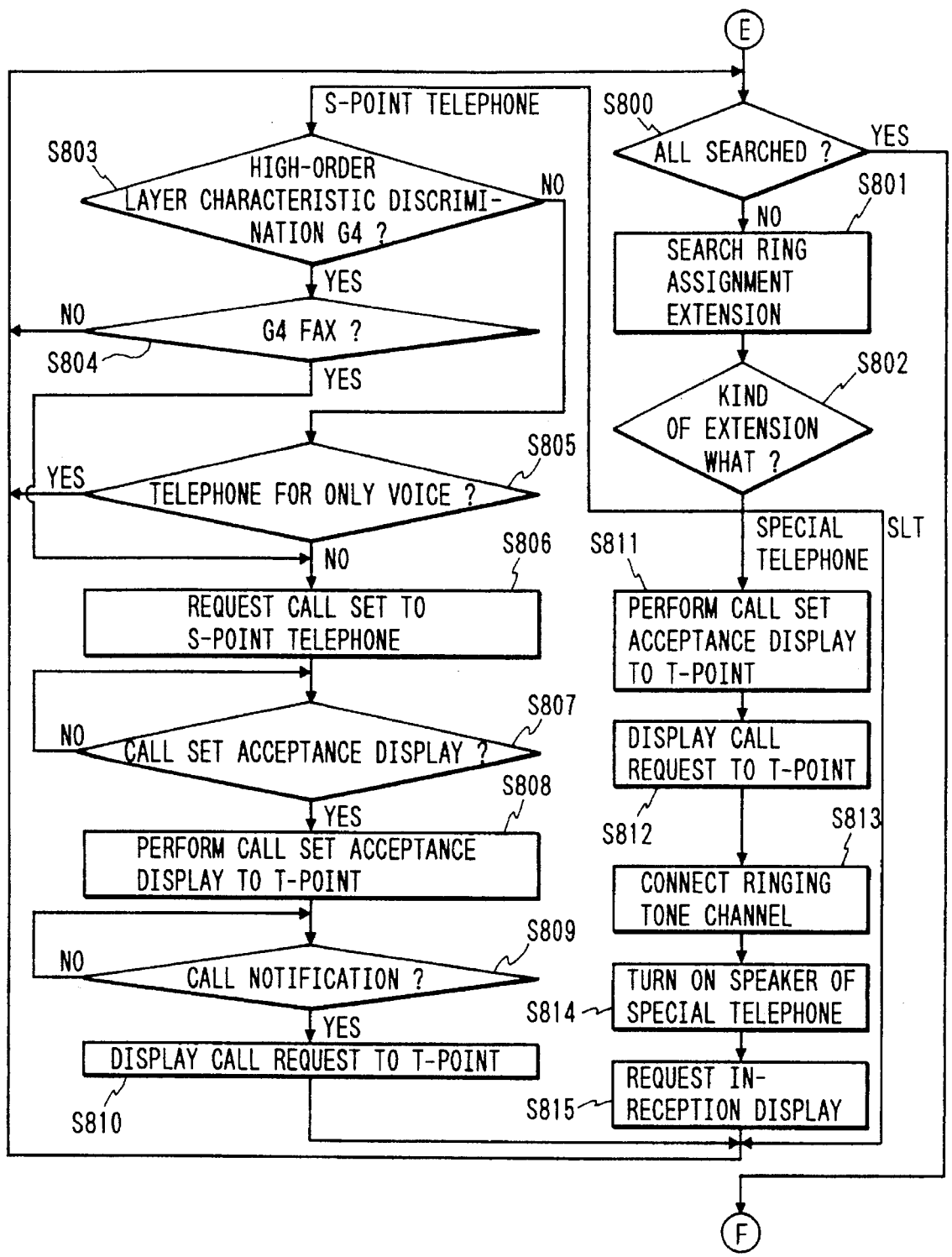

When the information transfer ability indicates the non-limited digital in step S516 in FIG. 5, the main control unit 126 executes the processes shown in FIG. 8.

The main control unit 126 checks to see if the calling process has been finished or not in step S800. If NO, the ring assignment extension registered in the memory 126M is extracted in step S801.

When the main control unit 126 determines in step S802 that the ring assignment extension extracted in step S801 is the S-point telephone by referring to the memory 126M, a check is now made in step S803 that the high-order layer characteristic discrimination data indicates the G4 facsimile or not by referring to the high-order layer consistency information element which has been received from the external line and stored in the memory 126M. If YES, step S804 follows. If NO, or when such an information element is not transmitted, step S805 follows.

In step S804, the main control unit 126 discriminates whether the S-point telephone terminal extracted in step S801 is the G4 facsimile (including the G4 facsimile having the G3 function) or not by referring to the memory 126M. If YES, step S806 follows. In step S805, the main control unit 126 checks to see if the S-point telephone terminal is a terminal which can handle only the voice or not by referring to the memory 126M. If yes, the processing routine is returned to step S800 without executing the calling process.

In step S806, the call set request is sent to the S-point telephone and the apparatus waits for the generation of the call set acceptance display from the S-point telephone. When the main control unit 126 recognizes the call set acceptance display from the terminal in step S807, the call set acceptance display is sent to the T point, namely, the external line 103 to which a reception call is performed by the ISDN-T point interface 108 in step S808. Subsequently, when the main control unit recognizes the call notification from the S-point telephone in step S809, the call request display is sent to the external line 103 in step S810. The processes in steps S808 and S810 are omitted so long as they have already been executed at least once by another route.

When it is decided in step S802 that the ring assignment extension is a special telephone, step S811 follows. The processes in steps S811 to S815 are similar to those in steps S609 to S613.

When the ring assignment extension is the SLT or G3 facsimile in step S802, the processing routine is returned to step S800 without executing the processes.

Although the embodiment has been described with respect to the facsimile communication, the invention can be also applied to the computer communication. That is, although the embodiment has been described with respect to the G3 and G4 facsimile apparatuses, the invention can be also applied to the analog computer communication and the digital computer communication.

Although the invention has been described with respect to the preferred embodiment, the invention is not limited to the foregoing embodiments but many modifications and variations are possible within the spirit and scope of the appended claims of the invention.

We claim:

1. A private branch exchange comprising:
   detecting means for detecting a call reception from an analog external line;
   a digital interface for connecting a digital terminal capable of performing a digital procedure for an ISDN; and
   judging means for judging whether the digital terminal connected to said digital interface is capable of performing an analog procedure for an analog line,
   wherein if said judging means decides that the digital terminal is capable of performing the analog procedure for the analog line when the call reception is detected by said detecting means, said digital interface transmits a set-up message corresponding to the digital procedure for the ISDN to the digital terminal.

2. An exchange according to claim 1, wherein when said judging means determines that the terminal does not correspond to the analog procedure for the analog line, said digital interface does not transmit the set-up message to the digital terminal.

3. An exchange according to claim 1, wherein the analog procedure for the analog line includes a G3 facsimile procedure.

4. An exchange According to claim 1, wherein the digital interface transmits the set-up message to a G3/G4 facsimile.

5. An exchange according to claim 1, wherein said judging means comprises memory means for storing the type of digital terminal and judges whether or not the digital terminal corresponds to the analog procedure on the basis of said memory means.

6. A private branch exchange comprising:
   an ISDN-S point interface for connecting a G3/G4 facsimile;
   detecting means for detecting a request for a G3 communication from the G3/G4 facsimile; and
   calling means for calling an external analog line on the basis of the request for the G3 communication detected by said detecting means.

7. A private branch exchange comprising:
   detecting means for detecting an incoming call from an external analog line;
   an extension digital interface for connecting a digital terminal which is capable of performing a digital procedure for a digital line; and
   judging means for judging whether the digital terminal connected to said extension digital interface is capable of performing an analog procedure for an analog line,
   wherein said extension digital interface transmits incoming call information to the digital terminal corresponding to the digital procedure for the digital line on the basis of a judgment by said judging means.

8. An exchange according to claim 7, wherein, when said judging means determines that the digital terminal does not correspond to the analog procedure for the analog line, said extension digital interface does not transmit the incoming call information to the digital terminal.

9. An exchange according to claim 7, wherein the digital procedure for the digital line includes an ISDN procedure and the analog procedure for the analog line includes a G3 facsimile procedure.

10. An exchange according to claim 7, wherein said extension digital interface transmits the incoming call information to a G3/G4 facsimile.

11. An exchange according to claim 7, wherein said extension digital interface transmits the incoming call information to the digital terminal on the basis of the judgment by said Judging means in a case where the incoming call from an external analog line is detected by said detecting means.

12. An exchange according to claim 7, wherein said extension digital interface transmits the incoming call information to the digital terminal in a case where said judging means judges that the digital terminal corresponds to a communication corresponding to the analog procedure.

13. An exchange according to claim 12, wherein said extension digital interface transmits the incoming call information to the digital terminal in a case where said judging means judges the digital terminal corresponds to an audio communication.

14. An exchange according to claim 12, wherein said extension digital interface transmits the incoming call information to the digital terminal in a case where said judging means judges the digital terminal corresponds to a G3 communication.

15. An exchange according to claim 7, wherein said judging means comprises memory means for storing the type of the digital terminal and judges whether the digital terminal corresponds to the analog procedure on the basis of said memory means.

16. An exchange according to claim 7, wherein the digital line is an integrated service digital network.

17. An exchange according to claim 7, wherein said extension digital interface connects a G4 facsimile, and said judging means judges whether the G4 facsimile has a G3 facsimile communication function.

18. An incoming call process method for a communication system, comprising the steps of:
   detecting an incoming call;
   discriminating whether a terminal, which is connected to a digital interface, is capable of performing an analog procedure for an analog line; and
   informing the extension of the incoming call using a digital procedure for a digital line, when the terminal is capable of performing the analog procedure.

19. A method according to claim 18, wherein the incoming call from an analog line is detected in said detecting step.

20. A method according to claim 18, wherein the incoming call from a digital line is detected in said detecting step.

21. A method according to claim 18, wherein the incoming call having a predetermined attribute is detected in said detecting step.

22. A method according to claim 18, wherein the analog procedure discriminated in said discriminating step is a G3 facsimile procedure.

23. A method according to claim 18, wherein it is discriminated in said discriminating step whether the terminal is a G3/G4 facsimile.

24. A method according to claim 18, wherein an ISDN interface is used for informing the terminal in said informing step.

25. A method according to claim 18, wherein said discriminating step is performed to each of a plurality of terminals.

26. An outgoing call process method for a communication system, comprising the steps of:

receiving a communication request from a terminal according to a digital procedure for a digital line;

discriminating whether the communication request is for a G3 facsimile communication; and making an outgoing call via an external analog line when the communication request is for the G3 facsimile communication.

27. A method according to claim 26, wherein the communication request from a G3/G4 facsimile is received in said receiving step.

28. A method according to claim 26, wherein the communication request is received via an ISDN interface in said receiving step.

29. A method according to claim 26, wherein the external analog line is selected from the external analog line and an external digital line.

30. A private exchange apparatus comprising:

an analog external line interface for connecting an analog external line;

a digital extension interface for connecting a digital terminal which is capable of performing a digital procedure for a digital line and capable of performing an analog procedure for an analog line; and control means for controlling said digital extension interface so as to send a calling signal to the digital terminal using the digital procedure when a call is received via the analog external line.

31. An apparatus according to claim 30, wherein said control means includes means for judging whether the digital terminal connected to said digital extension interface is capable of performing the analog procedure.

32. An apparatus according to claim 30, wherein the digital procedure includes a G4 facsimile procedure and the analog procedure includes a G3 facsimile procedure.

33. An apparatus according to claim 30, wherein the calling signal includes a SETUP message.

34. An incoming call processing method for a private exchange connecting an analog external line and a digital terminal, said method comprising the steps of:

detecting an incoming call from the analog external line; and sending a calling signal from a digital extension interface to the digital terminal which is capable of performing a digital procedure for a digital line and capable of performing an analog procedure for an analog line.

35. A method according to claim 34, wherein whether the digital terminal connected to the digital extension interface is capable of performing the analog procedure is judged in said sending step.

36. A method according to claim 34, wherein the calling signal is sent to the digital terminal which is capable of performing the digital procedure including a G4 facsimile procedure and capable of performing the analog procedure including a G3 facsimile procedure.

37. A method according to claim 34, wherein the calling signal including a SETUP message is sent in said sending step.

\* \* \* \* \*

UNITED STATES PATENT AND TRADEMARK OFFICE
CERTIFICATE OF CORRECTION

PATENT NO. : 5,481,605

DATED : January 19, 1996

INVENTOR(S) : Shigeki Sakurai et al.

It is certified that error appears in the above-identified patent and that said Letters Patent is hereby corrected as shown below:

```
In the Drawings:
SHEET 6 OF 11

Figure 5B:
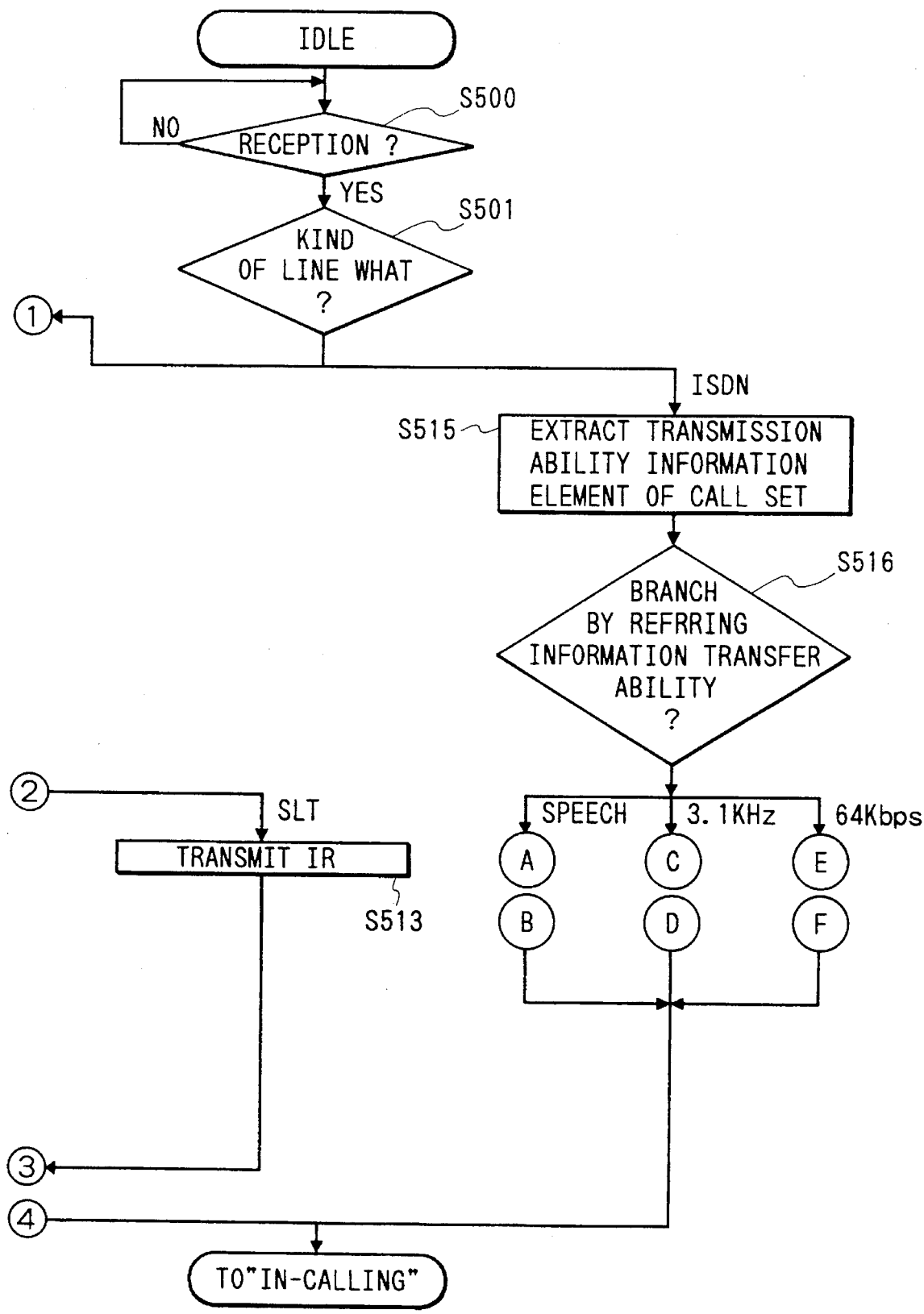

Figure 5B, "REFRRING" should read --REFERRING--.

COLUMN 1

Line 6, "Nov. 26, 1991now" should read --Nov. 26, 1991,
           now--.
    Line 24, "only-the" should read --only the--.

COLUMN 3

Line 32, "capacitor-" should read --capacitor--.
    Line 50, "lines-from" should read --lines from--.

COLUMN 4

Line 5, "line 309," should read --line 309.--.
    Line 11, "from," should read --from--.

COLUMN 6

Line 52, "digital" should read --digital.--.
```

UNITED STATES PATENT AND TRADEMARK OFFICE
CERTIFICATE OF CORRECTION

PATENT NO. : 5,481,605
DATED : January 19, 1996
INVENTOR(S) : Shigeki Sakurai et al.

It is certified that error appears in the above-identified patent and that said Letters Patent is hereby corrected as shown below:

COLUMN 7

Line 29, "dispaly" should read --display--.

COLUMN 9

Line 52, "According" should read --according--.

COLUMN 10

Line 29, "Judging" should read --judging--.
    Line 40, "judges" should read --judges that--.
    Line 45, "judges" should read --judges that--.

Signed and Sealed this

Fourth Day of June, 1996

Attest:

BRUCE LEHMAN

Attesting Officer     Commissioner of Patents and Trademarks